(12) United States Patent
Simione

(10) Patent No.: US 6,824,150 B2
(45) Date of Patent: Nov. 30, 2004

(54) CART FOR TRANSPORT OF PERSONNEL AND MATERIAL IN A HAZARDOUS ENVIRONMENT

(76) Inventor: Jason Simione, 5815 Polk St., Apt. #1, Hollywood, FL (US) 33021

( * ) Notice: Subject to any disclaimer, the term of this patent is extended or adjusted under 35 U.S.C. 154(b) by 0 days.

(21) Appl. No.: 10/117,573

(22) Filed: Apr. 4, 2002

(65) Prior Publication Data

US 2003/0071427 A1 Apr. 17, 2003

Related U.S. Application Data

(60) Provisional application No. 60/327,414, filed on Oct. 5, 2001.

(51) Int. Cl.[7] .............................................. B62B 11/00
(52) U.S. Cl. ................................ 280/47.34; 280/47.371
(58) Field of Search ........................... 280/47.34, 47.35, 280/47.371, 47.26, 651, 652, 79.2, 79.5, 79.6; D34/17, 18, 24, 25

(56) References Cited

U.S. PATENT DOCUMENTS

| | | | |
|---|---|---|---|
| 4,378,898 A | * | 4/1983 | Smeenge et al. ............ 224/328 |
| 4,978,023 A | * | 12/1990 | Behlmann et al. .......... 220/23.6 |
| 5,259,215 A | * | 11/1993 | Rocca ........................... 62/371 |
| 5,407,218 A | * | 4/1995 | Jackson ........................ 280/30 |
| 5,465,996 A | * | 11/1995 | Wisz ........................... 280/651 |
| 5,480,170 A | * | 1/1996 | Kaiser, II ..................... 280/30 |
| 6,189,440 B1 | * | 2/2001 | Amundson .................... 99/455 |
| 6,244,066 B1 | * | 6/2001 | LaRose ...................... 62/457.7 |
| 6,318,740 B1 | * | 11/2001 | Nappo ..................... 280/87.01 |
| 6,648,349 B1 | * | 11/2003 | Waller et al. ............. 280/47.35 |

* cited by examiner

Primary Examiner—Bryan Fischmann
(74) Attorney, Agent, or Firm—Jon A. Gibbons; Fleit, Kain, Gibbons, Gutman, Bongini & Bianco P.L.

(57) ABSTRACT

A cart for the transportation of personnel and equipment in a fire or other hazardous environment. The cart is constructed out of fire protective material and designed to float. There are wheels on the bottom surface, which are placed and designed to be able to be operative over very uneven surfaces. The structure also has the ability to store fire equipment and in addition on the top surface a fully dressed firefighter with a Scott Air Pack. The cart has handles, which can be adjusted so as to be folded into different locked positions based on the particular usage conditions.

11 Claims, 21 Drawing Sheets

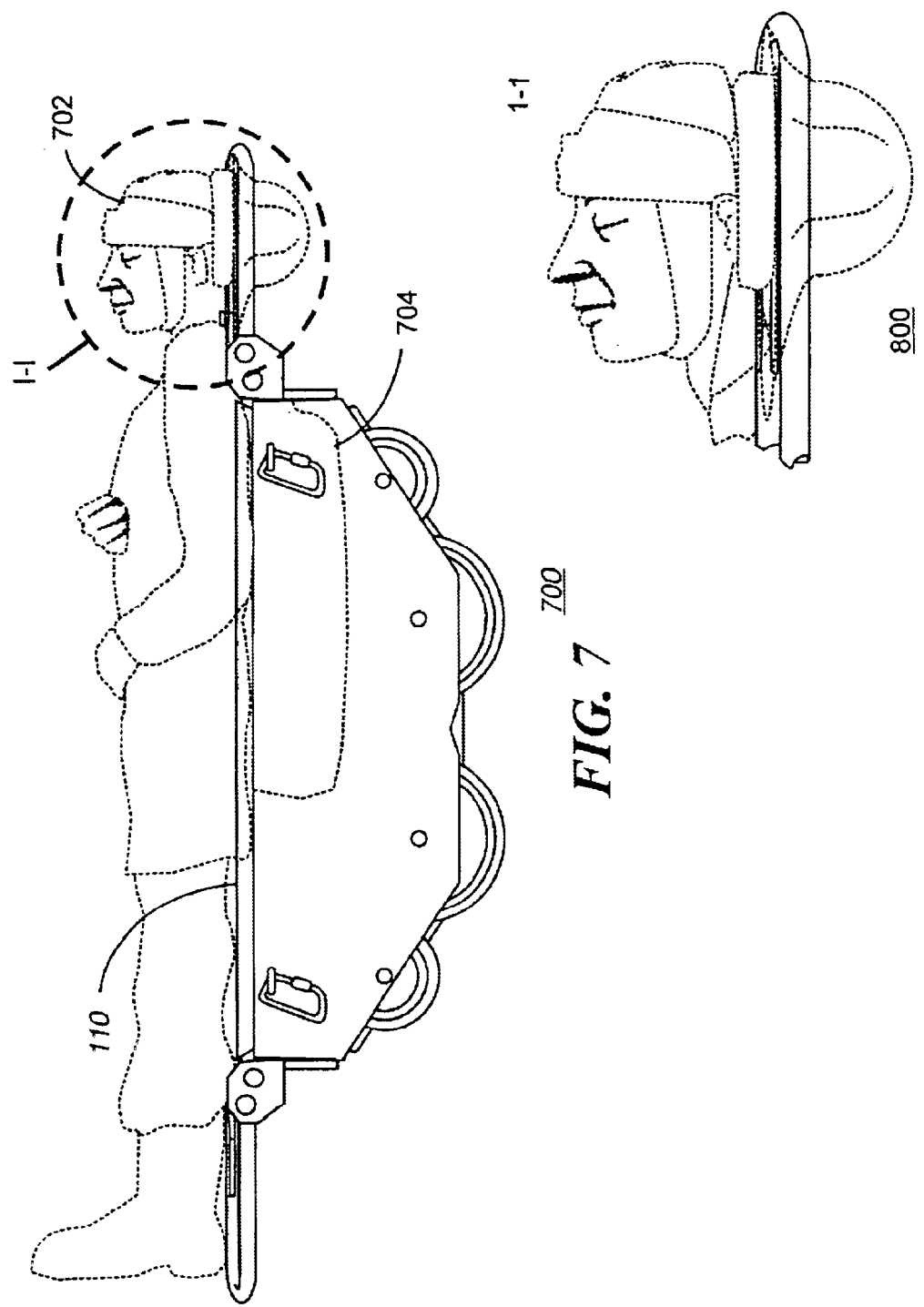

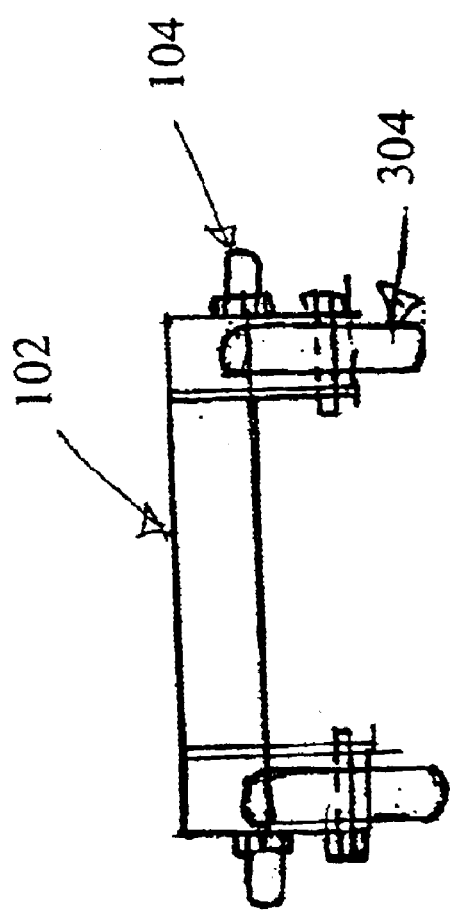

CART FOR TRANSPORT OF PERSONNEL AND MATERIAL IN A HAZARDOUS ENVIRONMENT

CROSS REFERENCE TO RELATED APPLICATIONS

This non-provisional application is based on the provisional patent application Ser. No. 60/327,414 with inventor Jason Simione, entitled "Cart for Transport of Personnel and Material in a Hazardous Environment" filed Oct. 5, 2001, which is hereby incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of emergency response equipment and more particularly to equipment for moving personnel in a hazardous environment such as a fire, war, or natural disaster.

2. Description of the Related Art

Emergency response personnel such as firemen, paramedics, hazardous material technicians, military personnel and special weapons and tactics (SWAT) members put themselves in harm's way by entering such areas as fires, natural disasters, war and even active crime scenes. Their equipment must be very rugged and designed to do specific jobs during the pursuit of their life saving activities.

Emergency response equipment varies greatly. As an example, fire-fighting equipment varies greatly, from hand tools such as pike poles, axes, roof hooks to power tools such as saws-all, jaws of life, to specialty clothing such as fire-hats, gloves and boots, to self-contained respirators such as Scott air packs and telecommunications equipment and two-way radios. All fire-fighting equipment is designed for use in very hazardous environments. Typically fire fighters hand carry equipment to various locations within a fire. Firefighting equipment is heavy and cumbersome. Therefore it is advantageous to be able to aid in the assembly and transportation of equipment in a fire to various locations. Accordingly, a need exists for a system to transport fire-fighting equipment.

Fires are life threatening be they in a home, apartment, high-rise building or forest. Rescue personnel such as firefighters risk life and limb to rescue people and in some cases actually become a victim themselves. One aspect of firefighting, which is particularly hazardous, is toxic smoke. Toxic smoke contains carbon monoxide, carbon dioxide, cyanide and numerous other products In fact, most victims of fires are in fact victims of smoke inhalation. People fall victim very quickly to the noxious smoke and poisonous fumes. Upon arriving at a scene of a fire, rescue personnel quickly determine if there are any people to be evacuated or rescued, knowing full well that a life may be at stake.

A top priority during a fire response is the safety of the occupants and the fire-fighting personnel. Victims are evacuated to a safe location. Rescue personnel typically guide occupants, and/or carry them to safety. In some cases the occupants are injured, or may have passed-out do to the fire's smoke and or vapors. Moving victims is especially difficult if they are large, heavy or obese.

Moreover, in a situation where there is more than one victim several trips may be necessary to move all of the victims to safety. It is not uncommon during evacuation of the first victim that the remaining victims are exposed to noxious smoke and fumes. Accordingly, a need exists to be able to bring in breathing apparatus to be quickly fitted to one or more victims of smoke inhalation During the course of fighting the fire it is possible for the firemen to be come injured. In order for the remaining firefighters to move the fallen firefighters they must carry them. In a typical situation the firefighter to be rescued has a Scott air pack on. A Scott air pack is essentially a SCUBA (Self Contained Underwater Apparatus) tank strapped on to the back of the firefighter with a heat resistant facemask. Given the weight and bulk of the Scott air pack along with the other protective clothing such as the fire hat, protective coat and trousers the firefighter is already encumbered with a lot of weight. Therefore it is very difficult when carrying out injured firefighters, which are in full protective gear including a Scott air pack while the rescuing firefighter is also wearing full protective gear including a Scott air pack.

In the case of carrying an injured person who does not have a Scott air pack out to safety, a preferred method is to have the person carried out on the back of the firefighter. This is quite difficult because of the Scott air pack that the rescuer is wearing. Removing the Air pack may be deadly. Accordingly, a need exists for an alternative system and method to transport an injured person from a fire while the rescuer and/or the victim are wearing a Scott air pack.

Still, another hazard faced by firefighters is becoming disoriented in a fire because of smoke, poor lighting and in many cases when the electricity has gone out, there is no lighting at all. A fire is a very confused and disorganized environment. In addition there are often times so much smoke and debris that equipment becomes lost. The life saving equipment may be one room over in a burning building and never used because it becomes lost in the fire. Accordingly, a need exists for a transport structure, which contains some level of lighting and self-locating devices.

Yet, still another hazard faced by firefighters and other rescue personnel is gunfire. Many times in a SWAT situation where people are shot or under gunfire, the rescuers may also be exposed to gunfire. Examples are hostage situations or even shooting at schools. In order to rescue the victims quickly the emergency response personnel must put themselves in harms way. The victims may be under gunfire during the rescue attempt. Accordingly, a need exists for a transport structure, which includes the ability to have some level of protective cover to gunfire for the victims and the rescuers.

Still, another hazard faced by firefighters and rescue personnel is water. During a fire, tremendous amounts of water are sprayed on the fire and the surrounding structures to extinguish the fire and prevent it from spreading. It is not uncommon for the water level to rise up to where equipment is covered and thus lost. Moreover, basements many times fill up with several inches of water. Accordingly, a need exists for a watertight structure that is able to float thus protecting the stored equipment.

Yet, another hazard faced by rescue personnel and firefighters is the exposure to hazardous materials and chemicals including radioactive materials. This may occur in a spill such as from a railroad car or other HAZMAT environments. Accordingly, a need exists for protection against radiation and other hazardous materials in certain types of fires.

One rescue cart or rescue vehicles commonly used in emergency situations is the ambulance stretcher and gurneys. These rescue vehicles typically have wheels and a detachable flat bed-like structure upon which a victim can be strapped. If pushed against an ambulance tailgate the wheels and support structure is designed so as to collapse in a folding fashion thus loading the entire structure and victim very quickly into the ambulance.

However this type of cart does not perform well within a fire because the wheels get caught on debris. Moreover, these rescue vehicles are actually top heavy once loaded. Additionally, the flat structure of the stretcher does not allow for the loading of a firefighter with a Scott air pack on his/her back in a face up position. Accordingly, the need exists for an improved cart for use in a hazardous environment especially in a fire.

SUMMARY OF THE INVENTION

Briefly, according to the present invention, disclosed is a rescue cart for the transportation of firefighting and rescue gear into an emergency location. This cart can also be used to transport fallen emergency personnel and more particularly a victim. The construction material of this cart can be comprised of different materials as further described below.

The present invention is a tool box/stretcher with an innovative wheel design. The present invention reduces the workload of rescuers by allowing them to carry a variety of equipment and supplies while using manpower presently available.

The present invention is different than anything currently available, because of its compact size and capacity. The capabilities are further enhanced by allowing the rescuer the ability to provide positive pressure breathing apparatus, as well as providing a thermal barrier for the victim.

The present invention permits one person the ability to carry the equipment that it would have normally taken between 5-15 persons. While being used in Fire Ground operations, The present invention also assists with the removal of victims and the deployment of equipment used during High Rise Fire Fighting, Rapid Intervention, Extrication, Hazmat, Weapons of Mass Destruction, S.W.A.T. and Military applications.

In one embodiment, the present invention has a three wheel inline design that allows it to transverse a variety of obstacles for example 4×4's, parking stops, crates, concrete blocks, and any type of rough terrain. With the eyebolts integrated into the present invention design, by simply attaching the prerigged rope system, The present invention has the ability to easily and safely be lowered down stairs, ladders and or the sides of buildings. Should the need arise, The present invention can be brought upstairs, it would require a second persons assistance.

In another embodiment, the present invention changes in seconds from a ground based stretcher into an all purpose aerial stretcher (i.e., Stokes Basket) while not requiring the need to change the way the victium has been packaged. This happens simply by placing the two webbing handles together over the patient and connecting them with the prerigged rope system.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings. Additionally, the left-most digit of a reference number identifies the drawing in which the reference number first appears.

FIG.7 is a perspective view of a rescue cart with a firefighter wearing a Scott Air Pak ready to be transported.

FIG.8 is a detail view of the firefighter's head resting on the fire hat while being transported on the cart.

FIG. 22 is a front view of the cart of FIG. 20.

DETAILED DESCRIPTION OF AN EMBODIMENT

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Overview of Construction Embodiments for the Cart

The present invention as would be known to one of ordinary skill in the art could be produced in a several ways.

In a first construction embodiment, the cart is constructed using welded sheets of metal with parts such as brackets, and handles. Also, this cart can be assembled using rivets. An important feature of the present invention is that at least the bottom and sides of the cart are watertight, the top may also be made watertight as well, but there is also a removable drain plug which will allow for any water that will accumulate within the sled to be easily removed. The metal, aluminum, has been found to work advantageously with the present invention because it is strong, fire resistant, and it is lightweight, and reasonably priced for construction. Other metals with lightweight properties have been found to work reasonably well.

In a second construction embodiment, the cart is constructed out of fiberglass or Kevlar formed over a ribbed-cage made from metal, plastic or composite. Fiberglass has the advantage of being very light and inexpensive, while Kevlar would be used in a cart that is to be "bullet-proof".

In a third construction embodiment the cart is constructed with sheeting pulled over a ribbed-cage made from metal, plastic or composite over which a plastic envelope is pulled.

In a fourth construction embodiment, the cart is constructed as a blow up "boat" that is strengthened in several areas for the wheels, handles and hinges. "Zodiac" boats are constructed this way and have the advantage of very small lightweight construction while maintain a watertight cart when inflated.

In a fifth construction embodiment, the cart is constructed from a plastic injection mold process.

In each of these construction embodiments, a particular attribute is optimized such as weight or storage size or being bullet proof.

In all of these different embodiments the need for a structure that is easy to pull especially in a cluttered field that may exist during a fire. These friction-abating devices can be such as wheels or non-stick surfaces such as plastic or Teflon or protruding bottom rails.

FIGS. 1 through 22 describes the present invention using several different views.

Cart Top View with Handles Open

Figure 1:
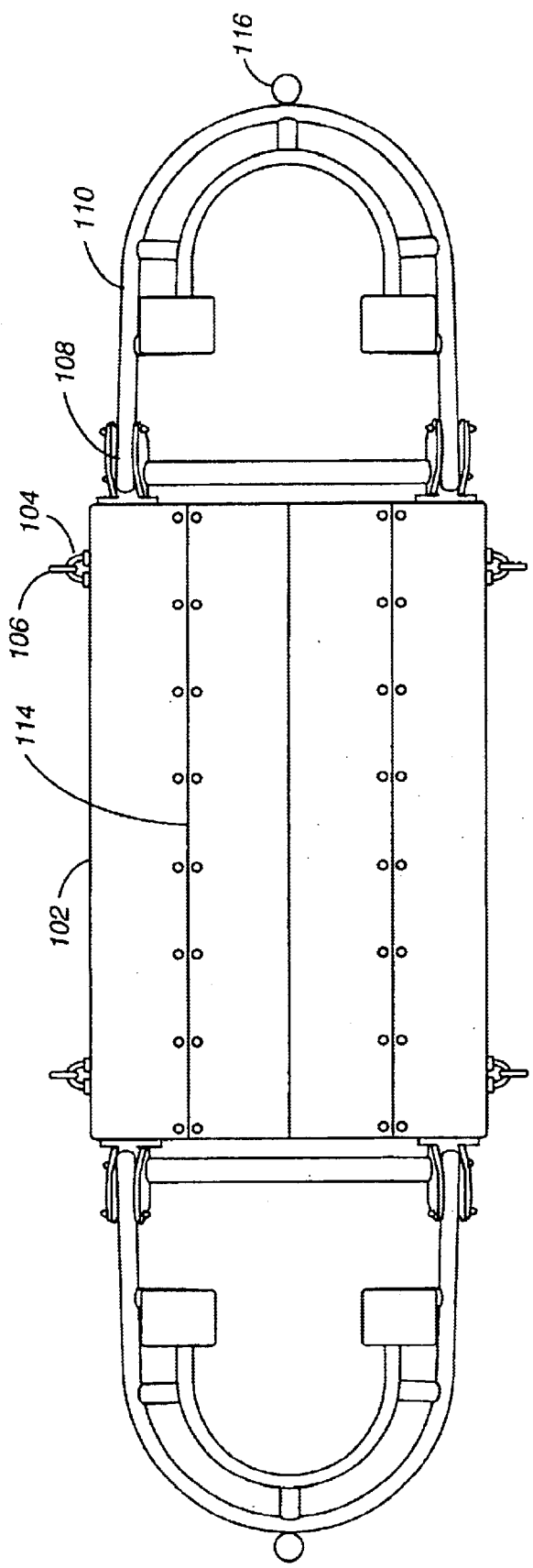
FIG. 1 is a top view of a rescue cart.

FIG. 1 illustrates a top view 100 of the rescue cart. The cart 102 can be described as an 8-wheel watertight container. On each of the four corners is a closed hook 104, which allows for a connection device such as a hook or carabineer 106 for rope or belt attachment commonly used for climbing. These attachment points can be used to tie down the cart during transportation or for other advantageous reasons that will be explained below. On both ends of the cart 102 is a multi-position pinned hinge 108 into which a handle bar 110 is affixed. On the top of the cart are two doors 112, which are affixed to the cart 102 with hinges 114. The doors 112 are shown in the closed position. The lead edge of the handle 110 has an eyehook 116, which is used to fix two or more carts together for pulling them in tandem.

Cart Top View with Handles Closed

Figure 2:
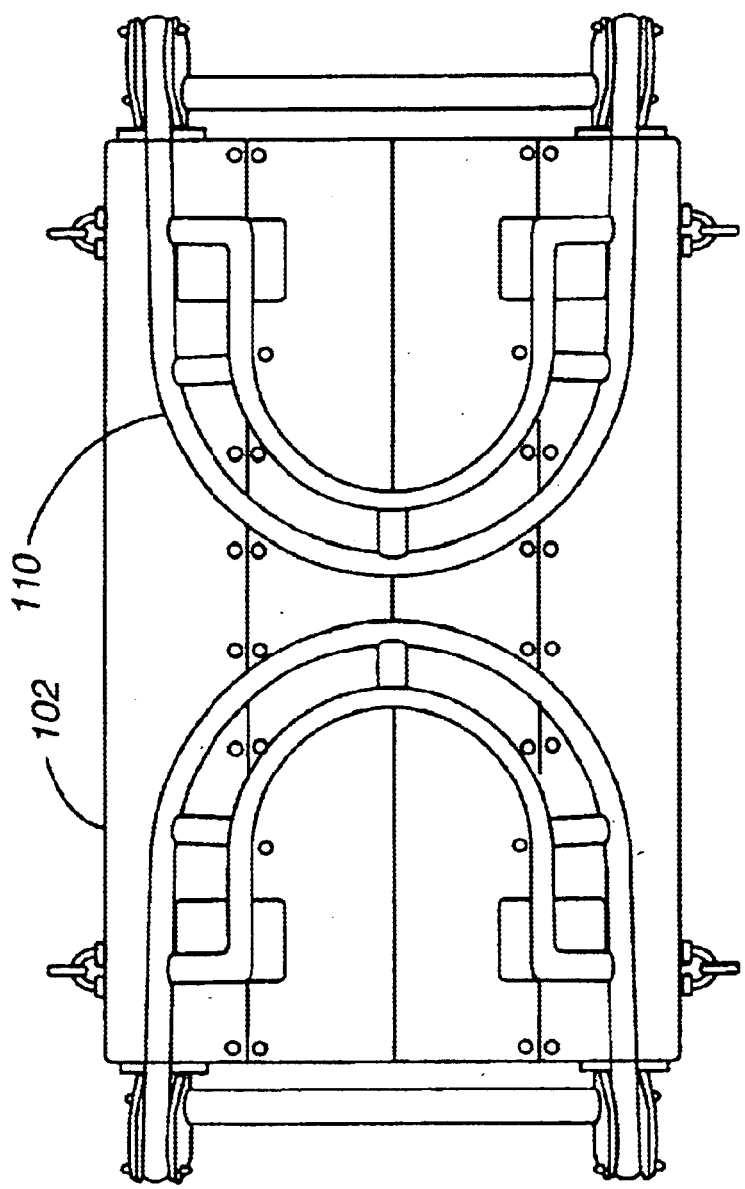
FIG. 2 is a top view of a rescue cart with handles placed over the hinged top.

Turning now to FIG. 2 shown is the top view 200 of the cart 102 with the handles 110 closed on top of the cart. This is how the cart can be stored or transported to a fire. It is noted that with the handles in this position even if the cart was tipped over the equipment that may be stored inside it will not fall out.

Cart Side View with Different Handle Positions

Figure 3:
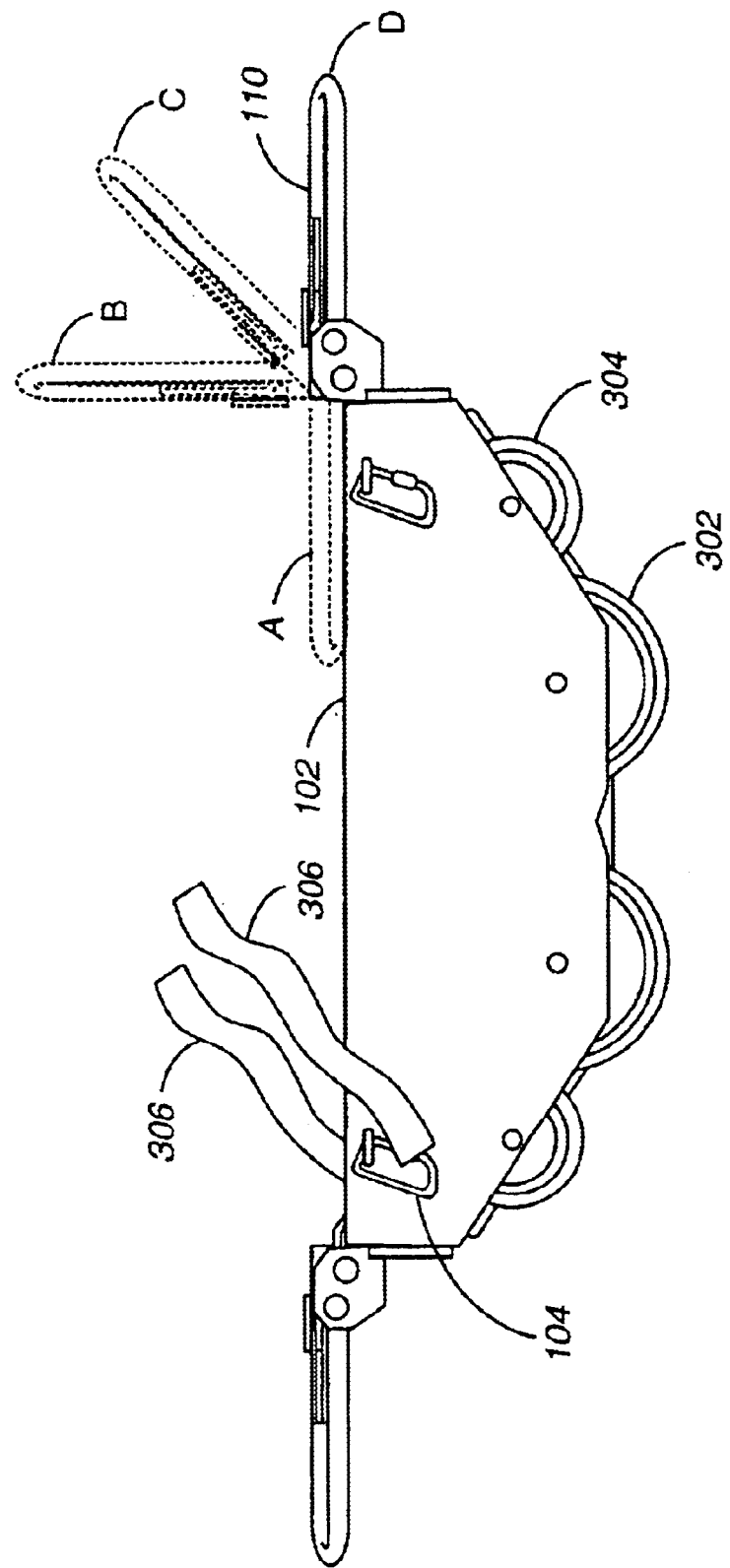
FIG. 3 is a side view of a rescue cart with handles shown in the different lockable positions.

FIG. 3 illustrates a side view 300 of the rescue cart. The cart 102 is shown with a total of eight wheels. Being symmetrical in the front, back and both sides shown is a set of large wheels 302, which carries the load of the cart under normal conditions. Auxiliary wheels 304 which is mounted so as to not normally touch the ground is used when the cart is being pulled or pushed over an object or for example up a flight of stairs. In this embodiment, the number of large wheels 302 and auxiliary wheels 304 are showed to be four. In one example wheels 304 are ½ inch lower. Other numbers of wheels and positions are within the true scope and spirit of the present invention. The side hook 104 is shown with a strap 306 affixed to it. The strap is used to tie down equipment to the top of the cart or as will be described below even to hold down a victim for transport. The cart handle 110 is shown in lockable positions A, B, C and D. These positions are pinned so that once in place will not move to the other positions unless the pin is pulled from both sides and a new position is pinned.

The A position is used to hold the top hinges closed and to make the cart as small as possible.

The B position is used for affixing a vertical rope or strap for hosting using a crane or similar equipment. Additionally, for very narrow turns within a building the vertical alignment will allow for tighter turns.

The C position might be described as the normal position. When in this position the handle top is at a convenient height for pulling or pushing by hand.

The D position is flat and away from the top of the cart. If both handles are in this position the top of the cart can now be used to transport people and equipment and as further described below.

Cart Side View with Handles

Figure 4:
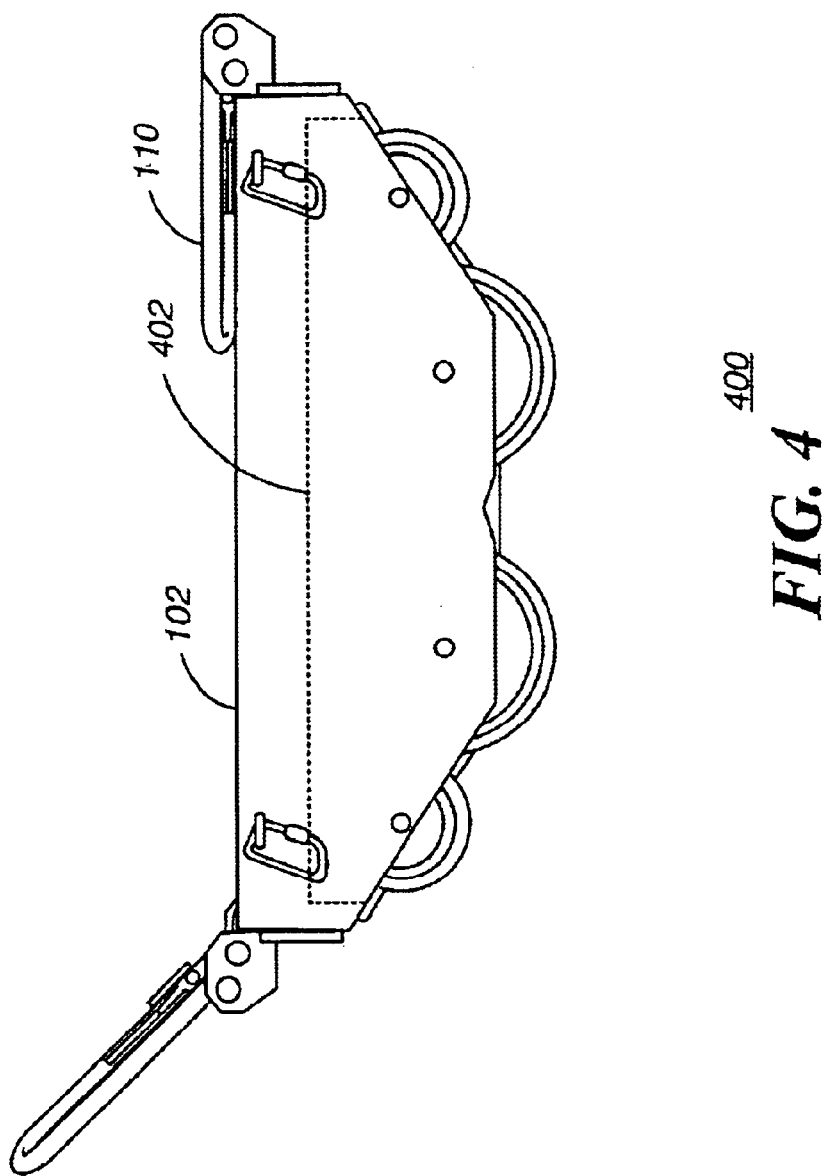
FIG. 4 is a side view of a rescue cart with handles shown in a typical usage positions.

Turning now to FIG. 4 illustrated is a side view of the cart 400. The cart 102 has the handles in different locked positions. One handle being in position C and the other handle is shown in position A. The watertight wheel well 402 is shown, which enables the cart to float.

Front View Showing the Bottom Ribs

Figure 5:
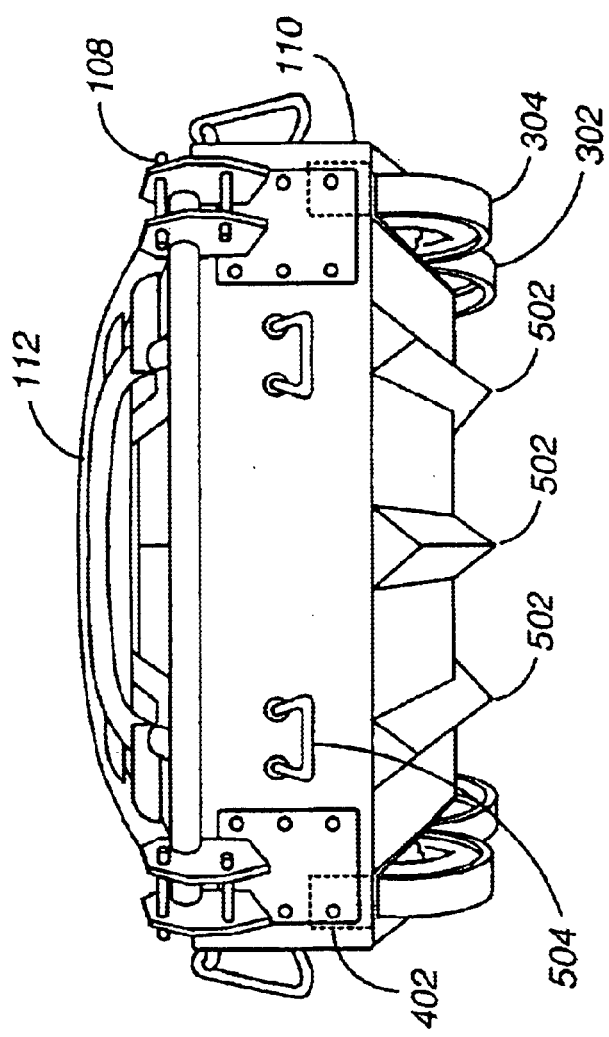
FIG. 5 is a front view of a rescue cart with bottom slides.

FIG. 5 illustrates a front view perspective 500. The cart 102 is shown with the hinges 108 and the handle 110 being folded down against the top of the cart 102 in position A. On the bottom are the wheels 302 and 304. The wheel 302, one of four, is normally in contact with the ground and carries the weight. The wheel 304 and the ribs 502 are used when the cart is pulled or pushed over an object or up a flight of stairs. Additionally, the ribs are used to add strength to the bottom surfaces. The mounting of the wheels 302 and 304 so as to maintain a watertight wheel well 402 is noted. The handles 504 are also shown as being mounted at each corner. This wheel well arrangement results in a cart with smooth sides, which will not allow the sides of the cart to hang, or snag on anything.

In an alternative arrangement solid bars are affixed to the cart at the location of the wheels. The wheels are mounted to the bars and do not have any wheel wells 402. While resulting in a non-smooth side, the cart does not have any wheel wells that may become clogged while pulling and also may be difficult to clean.

Perspective View of Cart with Storage for Tools.

Figure 6:
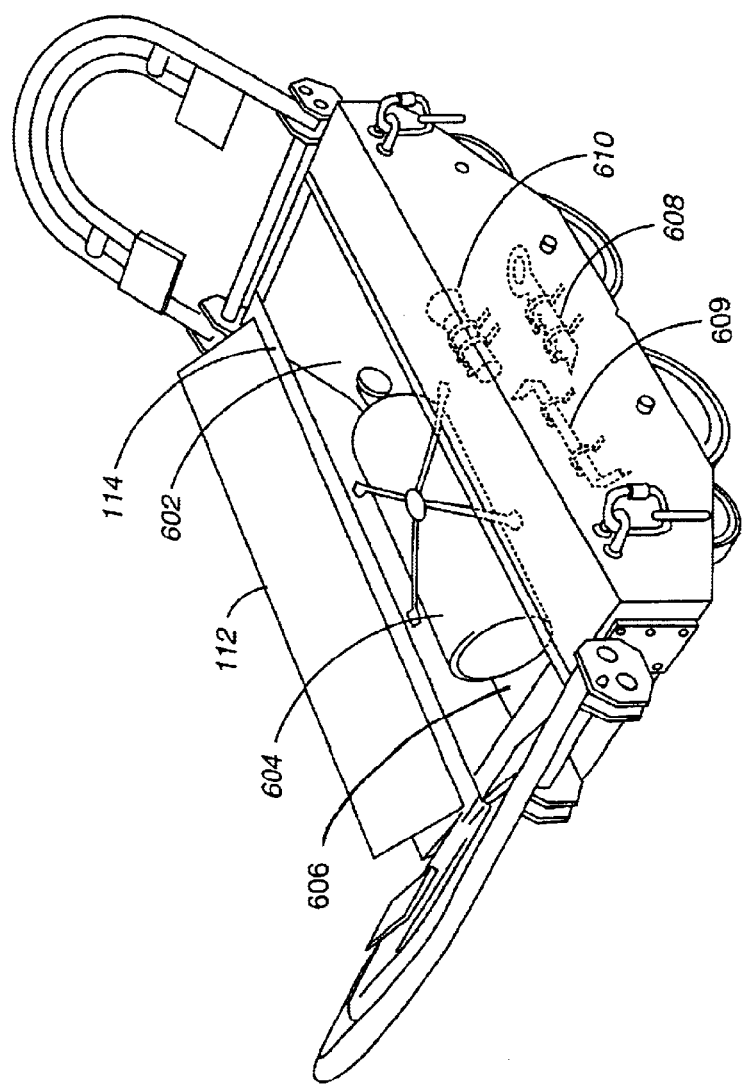
FIG. 6 is a perspective view of a rescue cart with tools both in and on the side of the cart.

Turning now to FIG. 6 shows a perspective view 600 of the cart 102. The side 602 is illustrated with several fire-fighting tools affixed. These tools may be such as a crow bar 609, flashlight 610, saw 608, and similar small tools and gear. It is noted that these tools and the mounting fixtures do not comprise the watertight compartment.

The top surface of the cart 102 is shown with one of the doors 112 open. This exposes the opening 606 into which additional fire-fighting gear is stowed 604. These tools are such as a Scott Air pack, a saws-all and in general heavier, larger tools and equipment. Additionally, a blanket (not shown) may be stowed for the purposes of sheltering a victim from fire. This blanket can be of a material such as Kevlar, which will afford an extra level of protection against being shot at, such as in the case of urban terrorists. In another example of a nuclear spill the blanked may be made of a material that will afford protection against radiation.

Perspective View of Cart with Closed Top.

FIG. 7 is a perspective drawing 700, which shows the cart 102 with the hinges 112 closed (not shown) and both handles 110 (not shown) in the D position. In this view it is noted that the cart 102 presents a flat surface that can be used for working or assembling fire-fighting equipment. Additionally, the cart 102 can be hidden behind to protect against the heat of a fire, radiation or being hit by flying debris such as from an explosion or gunfire. Also shown a firefighter 702 is lying on the top with the head and feet supported by the handles 110. The Scott Air Pack 704 is mounted on the firefighter's back and is shown below the top surface of the cart. The two-hinged doors 112 are spaced so that the resultant opening will allow the Scott air pack to fit into the opening 606 and yet the firefighters shoulders will not fit through the opening. Scoff air pack faceplate is not shown. Detail view I-I 706 is better described in FIG. 8 below. In one embodiment, the cart 102 has the dimension of 29 inches in length, 22 inches in width and 10.5 inches deep.

Perspective View of Cart with Firefighter Ready for Transport

Detail I-I 800 illustrated in FIG.8 shows the detail of the firefighter's helmet 802 which is tilted back and placed on the cart's 102 handles 110. This allows for safe support of the head during transport, while not requiring the helmet to be removed.

Perspective View of Cart with Firefighter Ready for Transport

Figure 9:
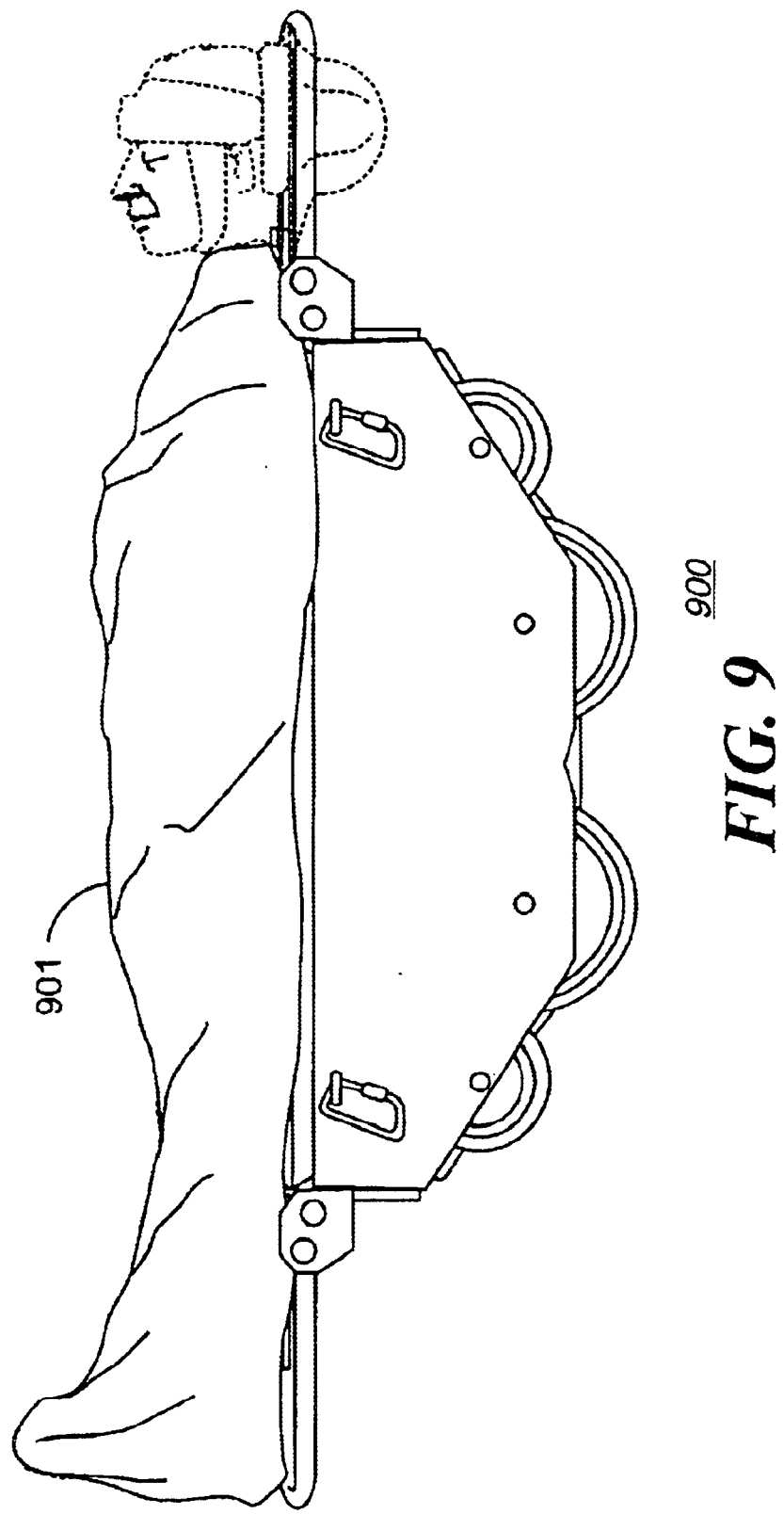
FIG. 9 is a firefighter covered by a blanket while on the cart.

FIG. 9 shows a side view 900 of the cart 102 with a firefighter 702 on the top of the cart 102 who is wrapped with a blanket 901 and is ready for transporting.

Perspective View of Cart with Locating Devices.

Figure 10:
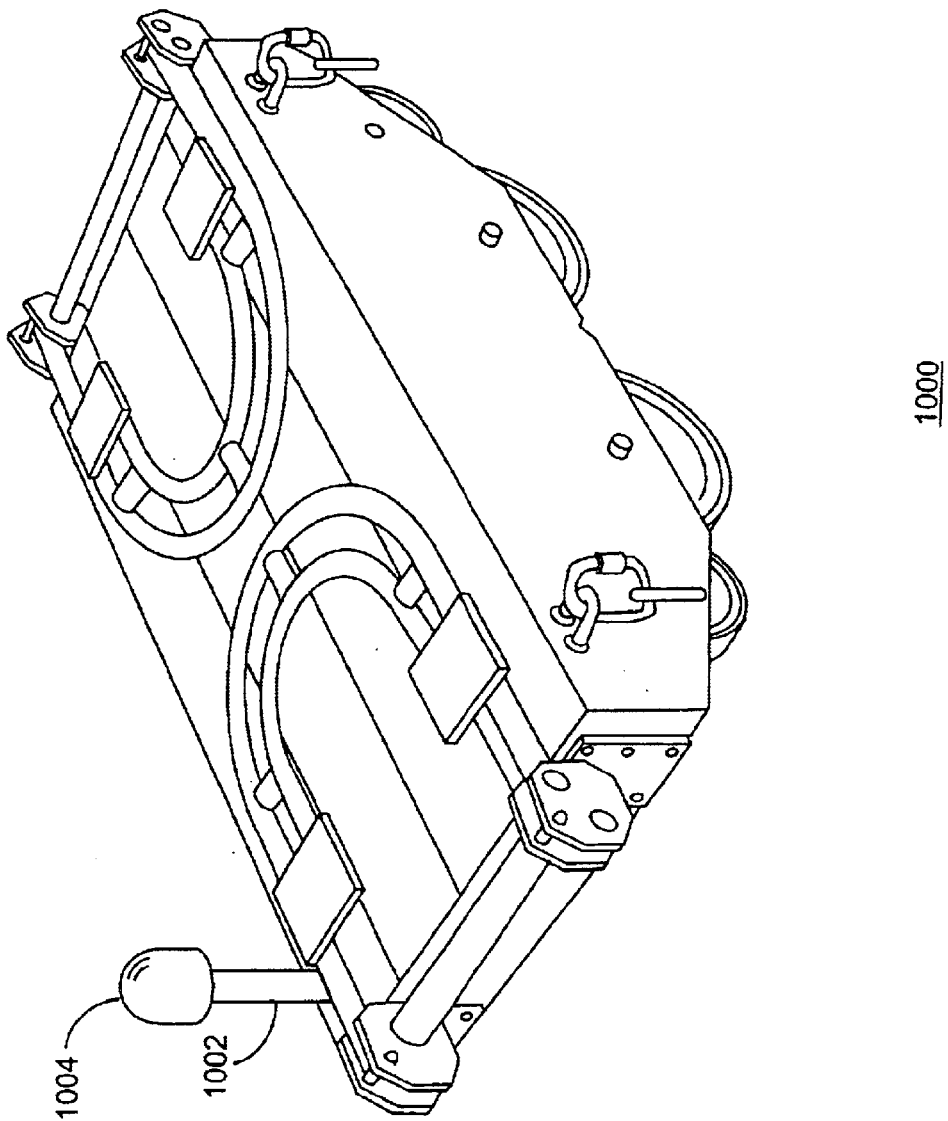
FIG. 10 is a perspective view of a rescue cart with optional locating multimedia and wireless equipment.

Turning now to FIG. 10 a perspective view 1000 is shown of the cart 1102 with optional locating devices. Affixed to the outside of the cart at the eyehook is a short mounting handle 1002. Upon this handle can be mounted several devices 1004 that will help to locate the cart if lost in a smoke filled building, or even in a large area like a forest fire range. These devices are such as a rotating fire-fighting light, a strobe, a GPS receiver with attached RF signal transmitter, and even a noisemaker such as a siren or chirper. The device is mounted high for illustrative purposes.

Perspective View of Cart with Alternative Construction Materials.

Figure 11:
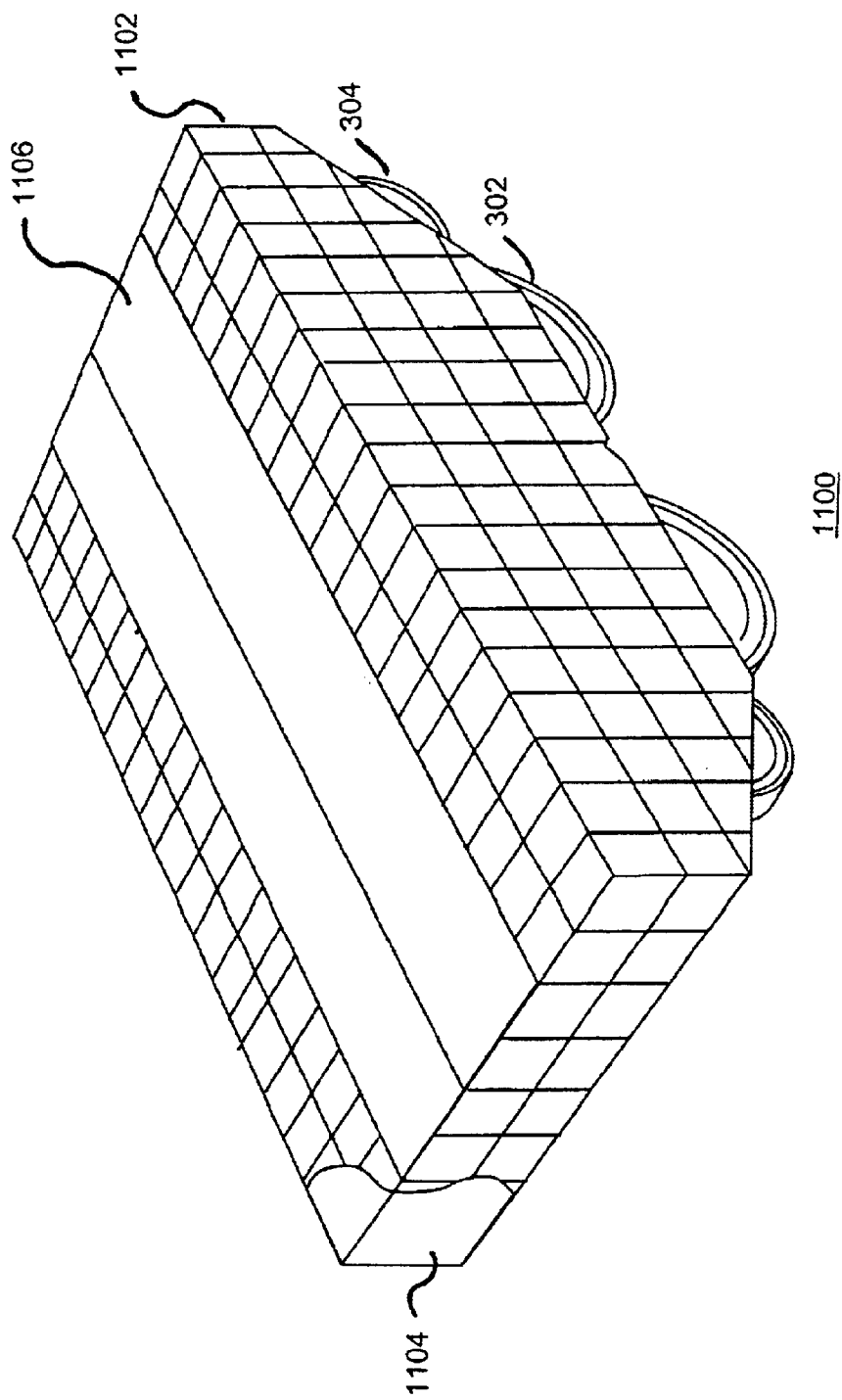
FIG. 11 is a perspective view of a rescue cart constructed as a ribbed-cage with optional watertight covering.

Turning now to FIG. 11 a perspective drawing 1100 is shown an alternative embodiment of the cart 1102. This alternative cart 1102 is constructed as a wire frame not unlike a grocery-shopping cart. The handles are not shown. The wheels 302 and 304 are mounted outside of the cart. It is very light and yet very strong. This wire frame cart is able to transport tools both inside and outside the cart. Additionally, as mentioned above it can be used to transport people. As it is a wire frame it will not retain water or small debris. Also tools are viewable through the side of the cart. As yet another alternative to this embodiment, a plastic cover 1104 can be pulled over the cart or placed within the cart. Adaptations may be necessary to expose the wheels. With this cover, little additional weight is added and yet the cart is watertight from rising water. If the plastic cover has flaps 1106 that cover the top, then the equipment inside the cart protected from water being sprayed in from the top. It is also possible to affix shields to the side of the cart such as Kevlar. These are not shown.

Alternative Embodiment of the Cart with Retracting Handles.

Figure 12:
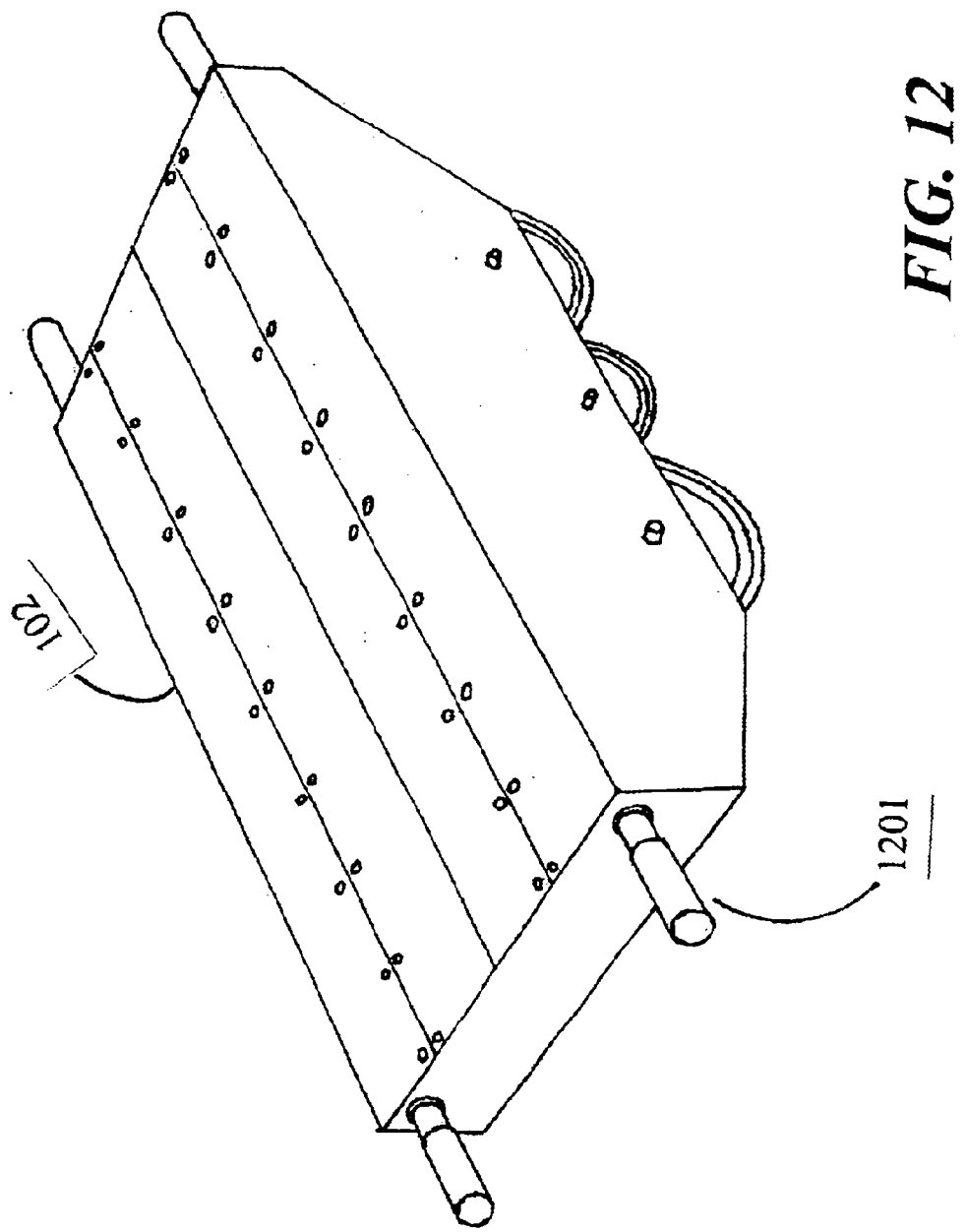
FIG. 12 is a side view of a rescue cart with handles shown in the different lockable positions.
Figure 13:
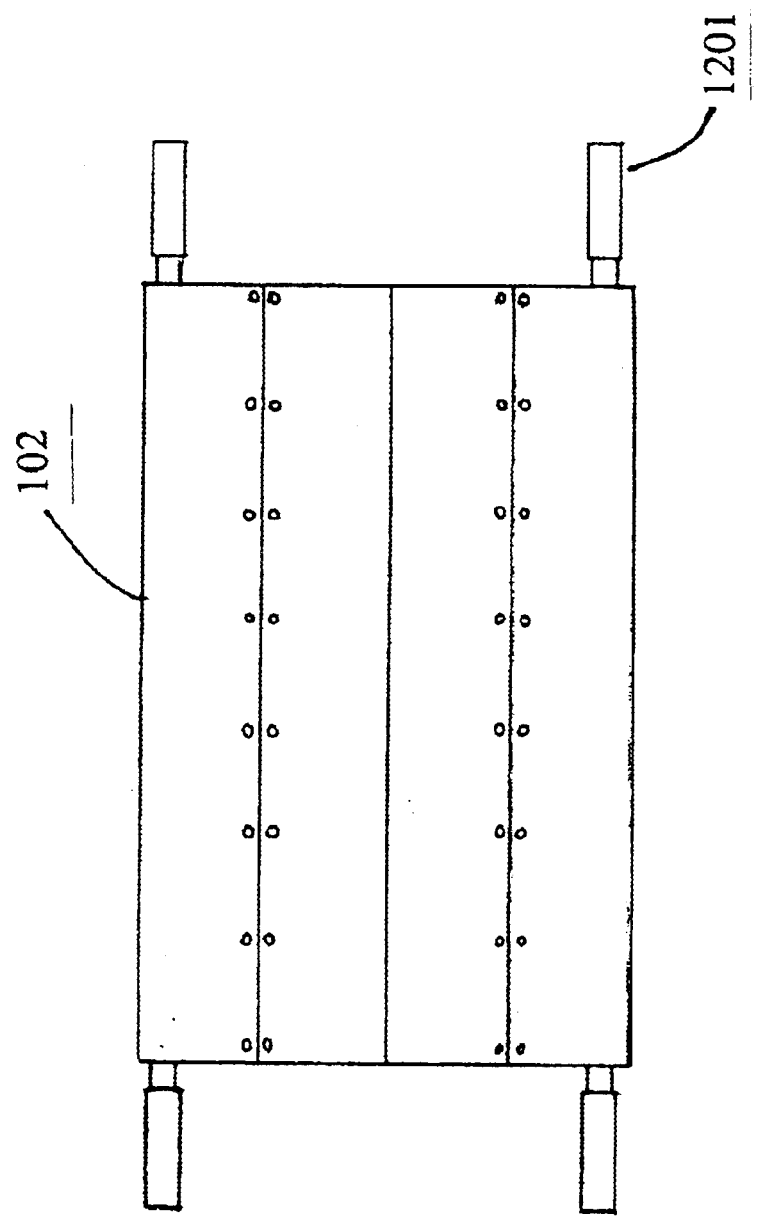
FIG. 13 is a top view of a rescue cart with handles of an alternative embodiment, according to the present invention.
Figure 14:
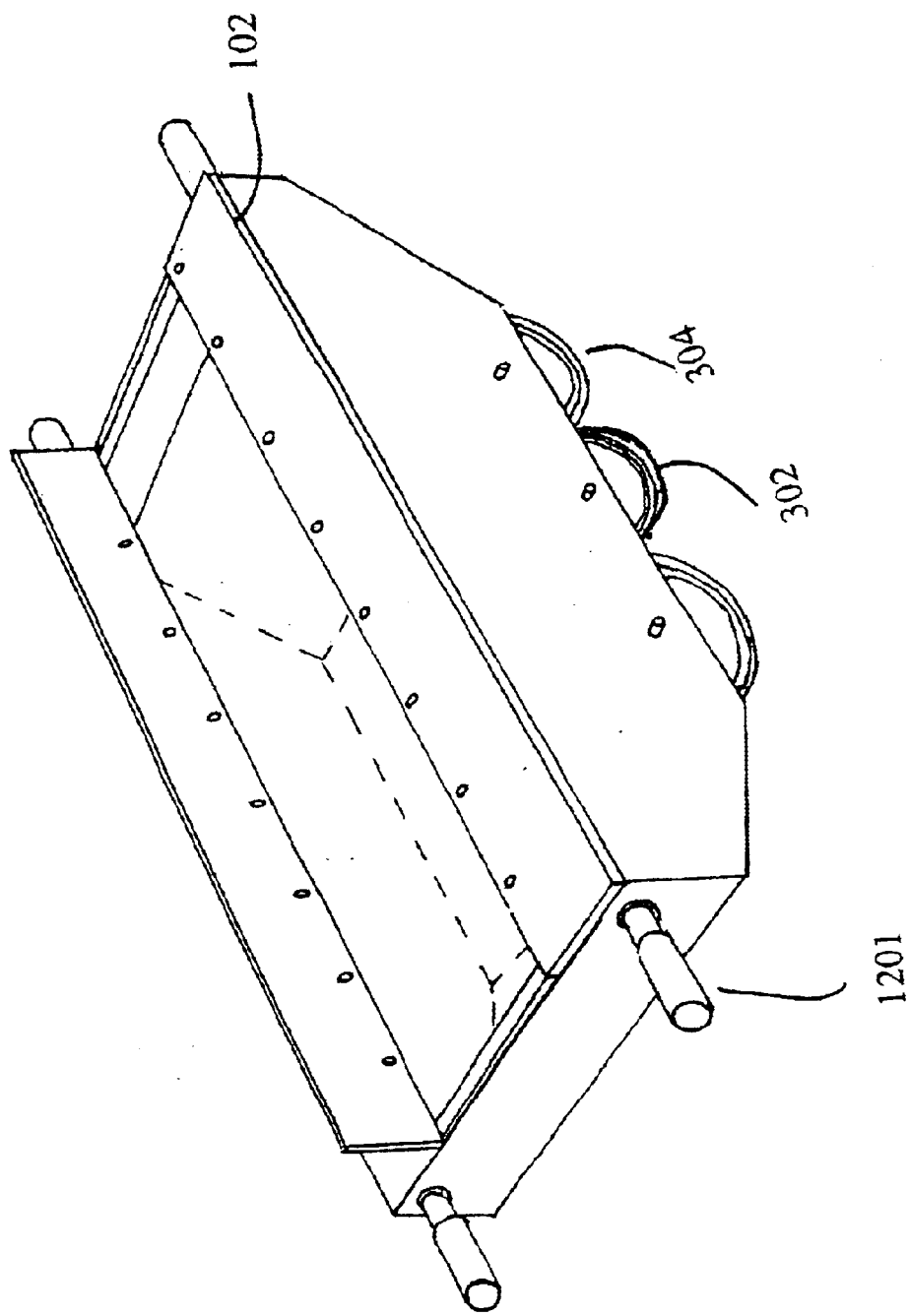
FIG. 14 is a side view of a rescue cart with handles inside and hinged top open, in the alternate embodiment of FIG. 13.
Figure 15:
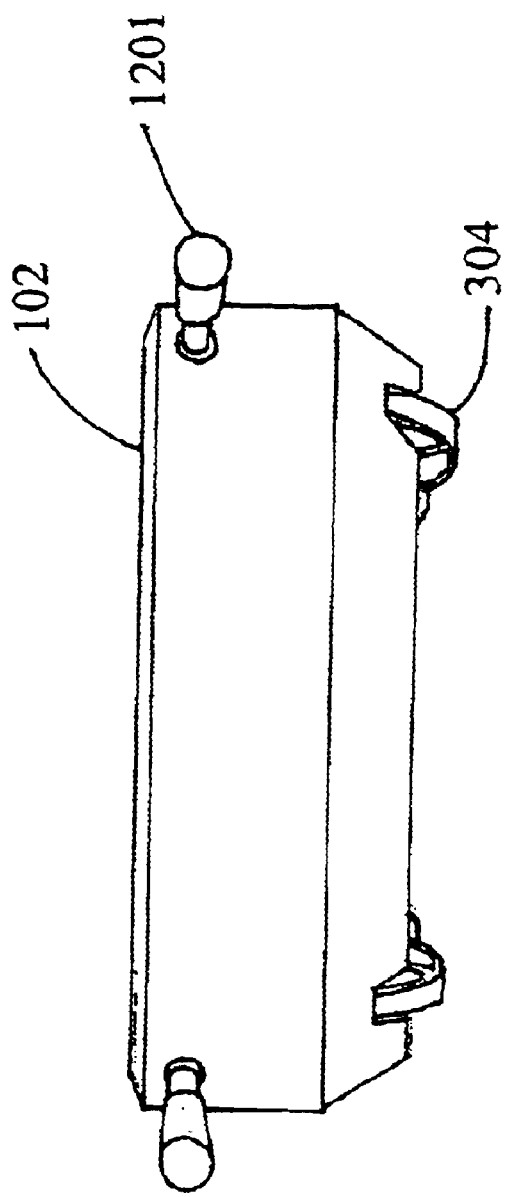
FIG. 15 is a front view of a rescue cart with handles inside, in the alternate embodiment of FIG. 13.

FIGS. 12–19 are a series of drawings illustrating handles 1201, which are retractable inside the cart 102. In particular, FIG. 12 is a side view, FIG. 13 is a top view, FIG. 14 is a side view, FIG. 15 is a front view, respectively of a rescue cart with handles 1201 shown in the different retracted positions.

Figure 16:
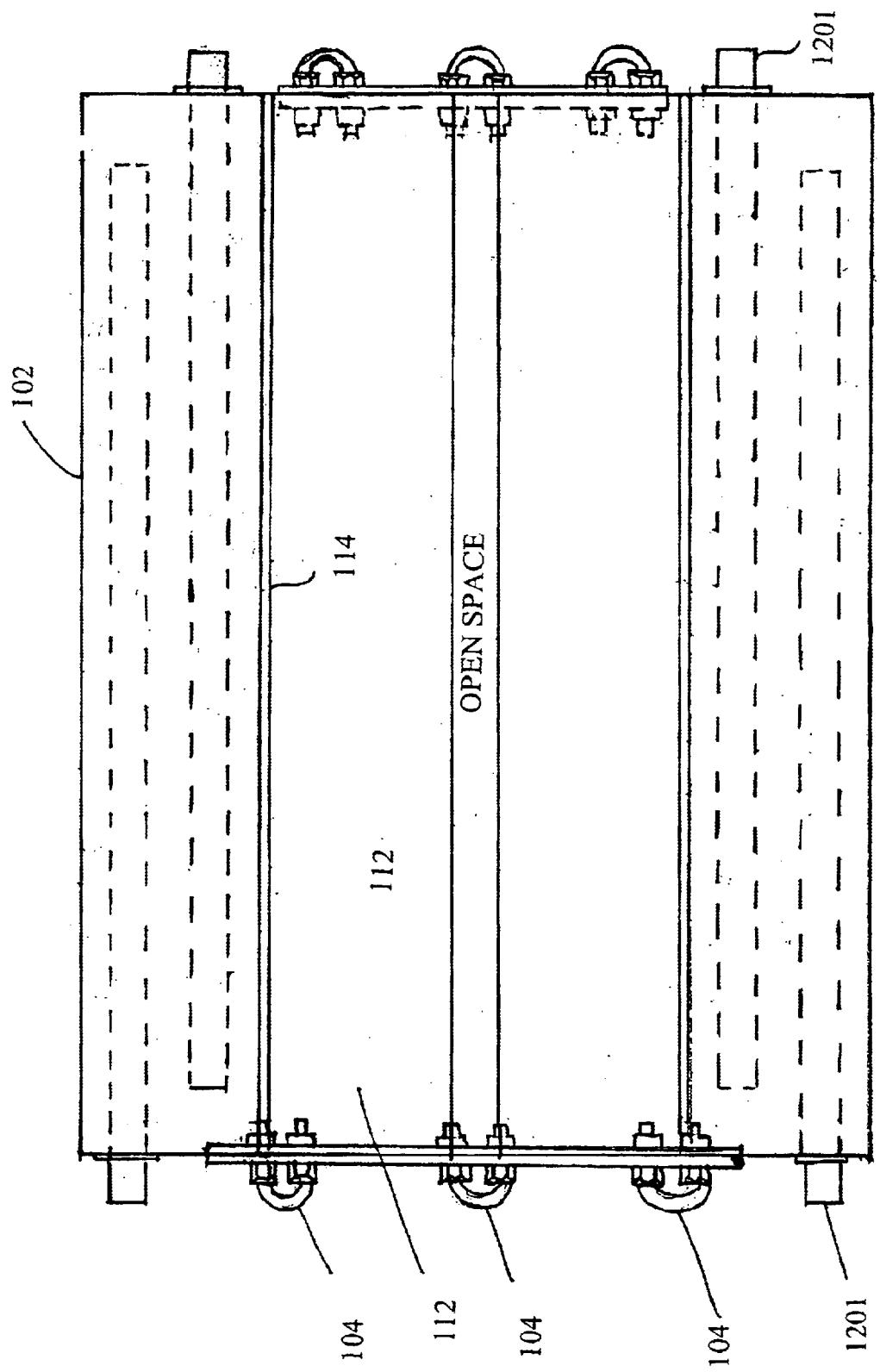
FIG. 16 is a top view of a rescue cart with handles closed, in the alternate embodiment of FIG. 13.
Figure 17:
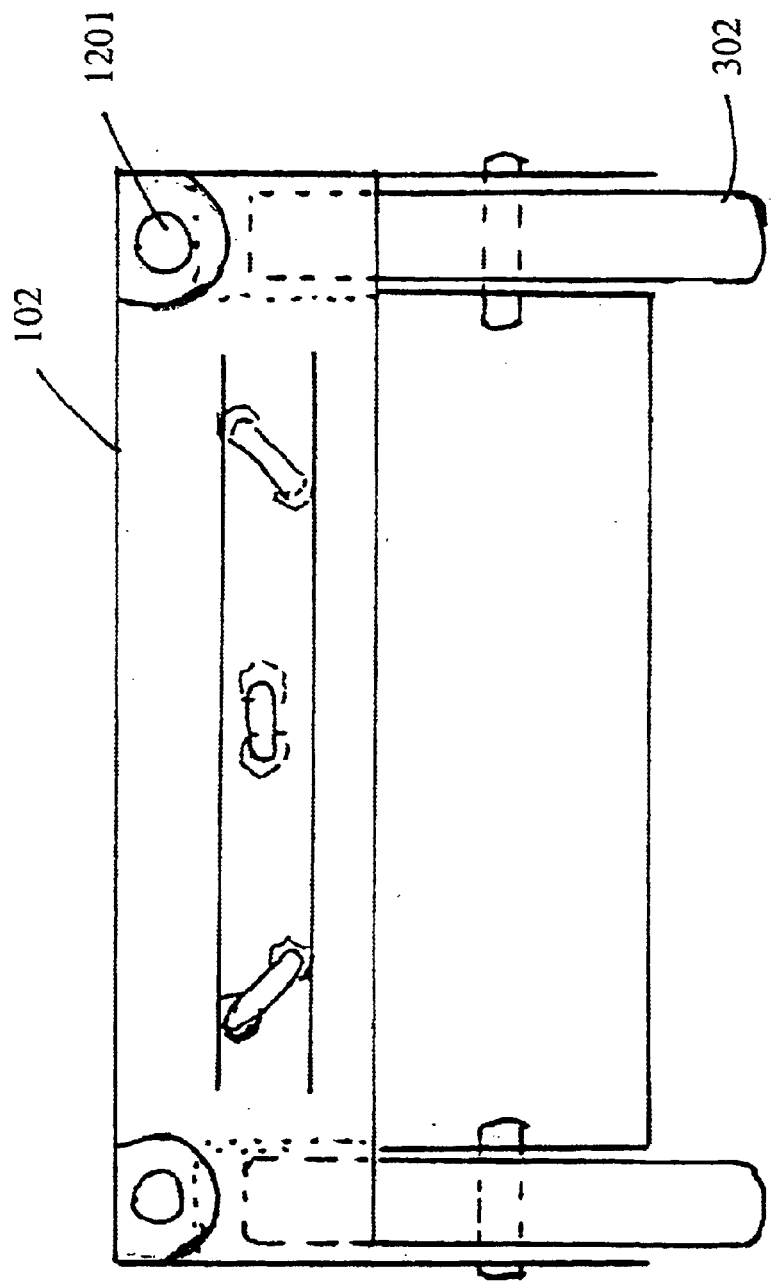
FIG. 17 is a front view of a rescue cart with handles inside, in the alternate embodiment of FIG. 13.
Figure 18:
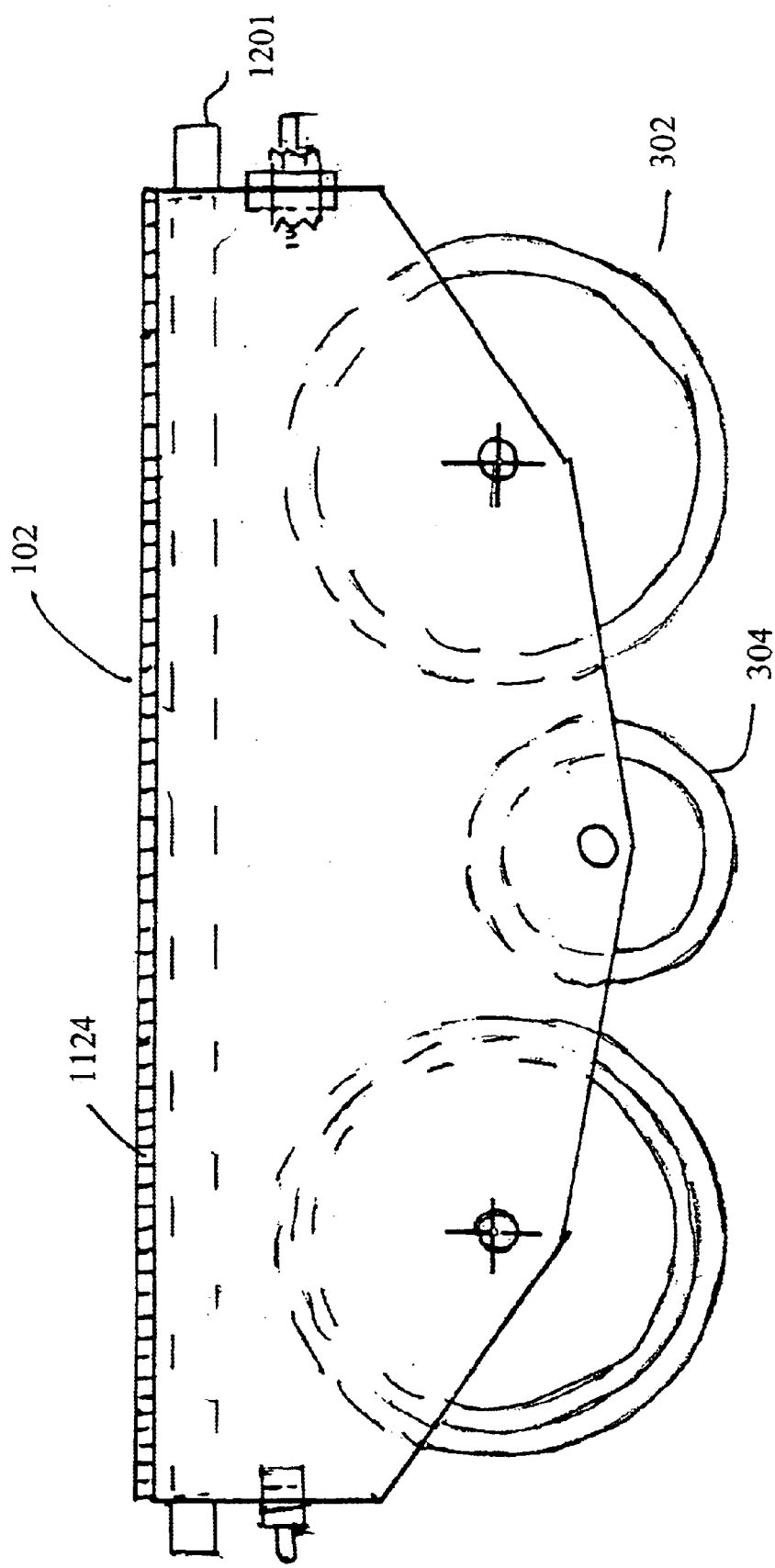
FIG. 18 is a side view of a rescue cart with handles inside and hinges shown, in the alternate embodiment of FIG. 13.
Figure 19:
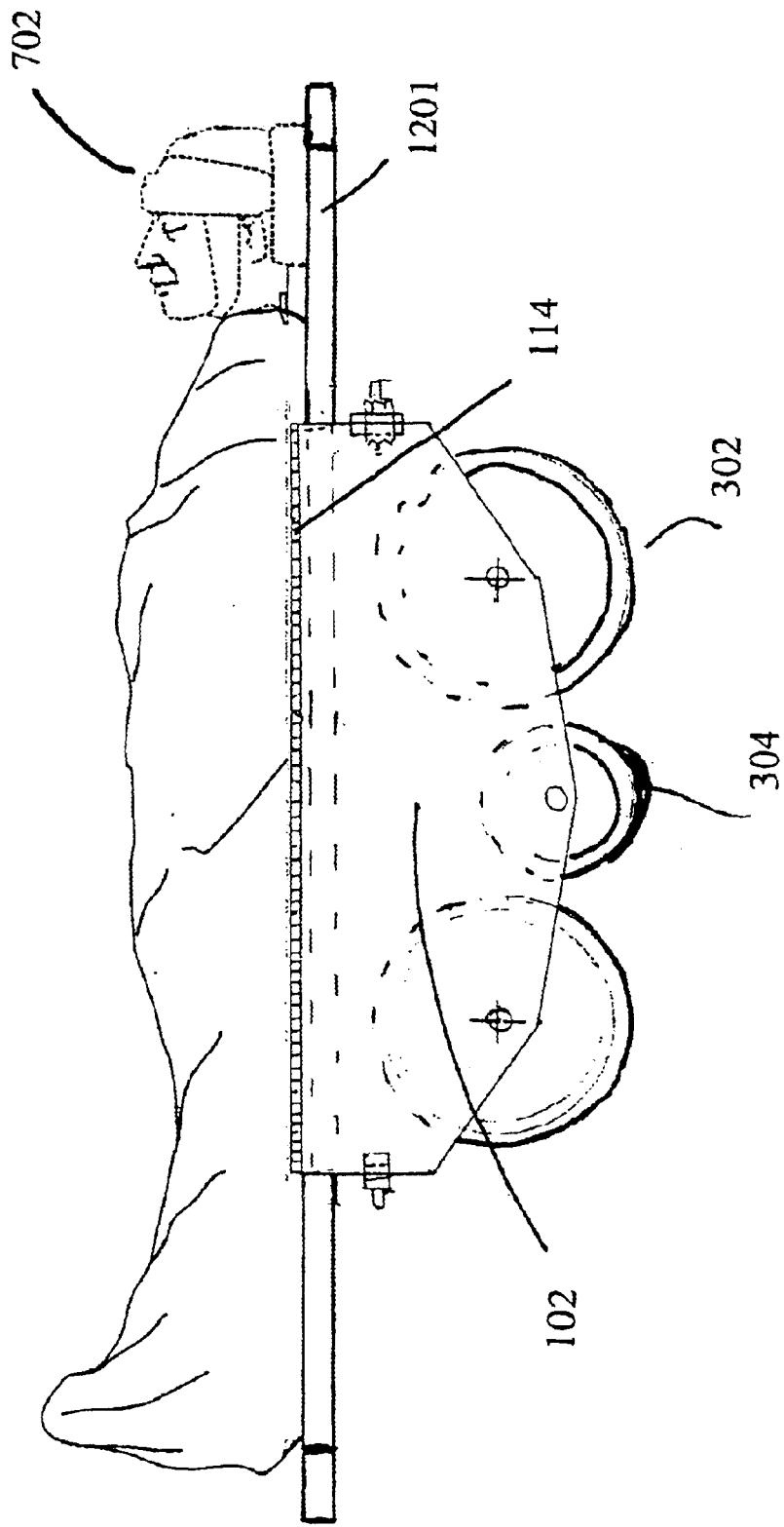
FIG. 19 is a side view of a rescue cart with handles extended and hinges shown, in the alternate embodiment of FIG. 13.

FIG. 16 is a top view; FIG. 17 a front view, and FIG. 18 a side view of a rescue cart 102 with handles 1201 illustrating the handles 1201 stored inside the cart 102. The handles 1201 in this embodiment are stored inside the cart 102 beneath the door 112 and an area that does not interfere with the Scott air pack 704 and the wheels 302. The handles 1201 in this embodiment are retractable through holes 1201 formed in the ends of the cart 102 as shown in FIG. 12. The holes are formed to pennit a slip-fit of the handles 1201. The handles can be solid or hollow in construction and are designed to hold the weight of the cart with equipment and a victim being transported. The handles can be stored inside optional tubes or guides 1602. FIG. 19 is a side view of a rescue cart with handles extended and hinges shown. Also shown a firefighter 702 is lying on the top with the head and feet supported by the handles 1201.

Alternative Embodiment of the Cart for Confined Spaces

Figure 20:
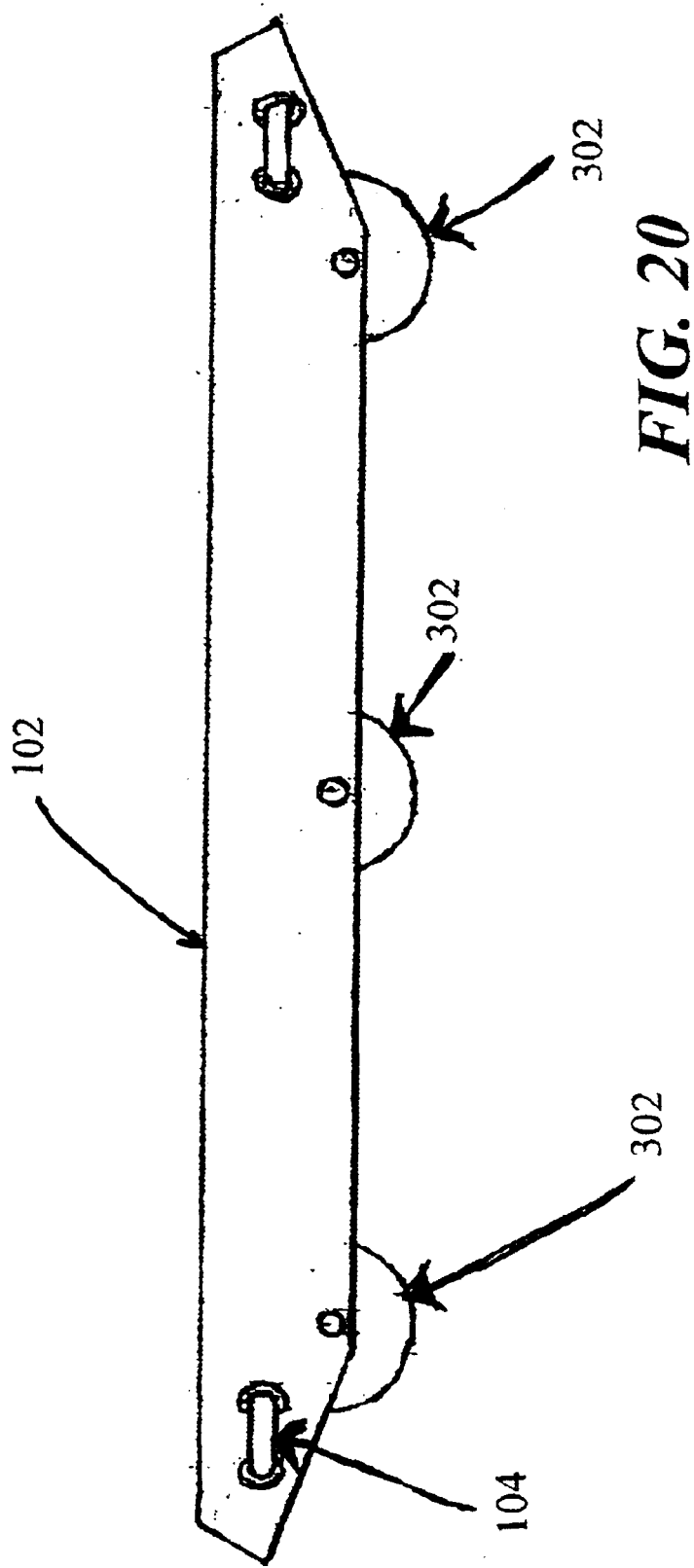
FIG. 20 is a side view of an alternate embodiment of a cart for confined spaces, according to the present invention.

FIG. 20 is a side view and FIG. 22 is a front view of the cart 102 for confined spaces, according to the present invention. This cart is sized to be smaller with typical dimensions of 36 inches long, 10 inches wide, and 4 inches in height.

Figure 21:
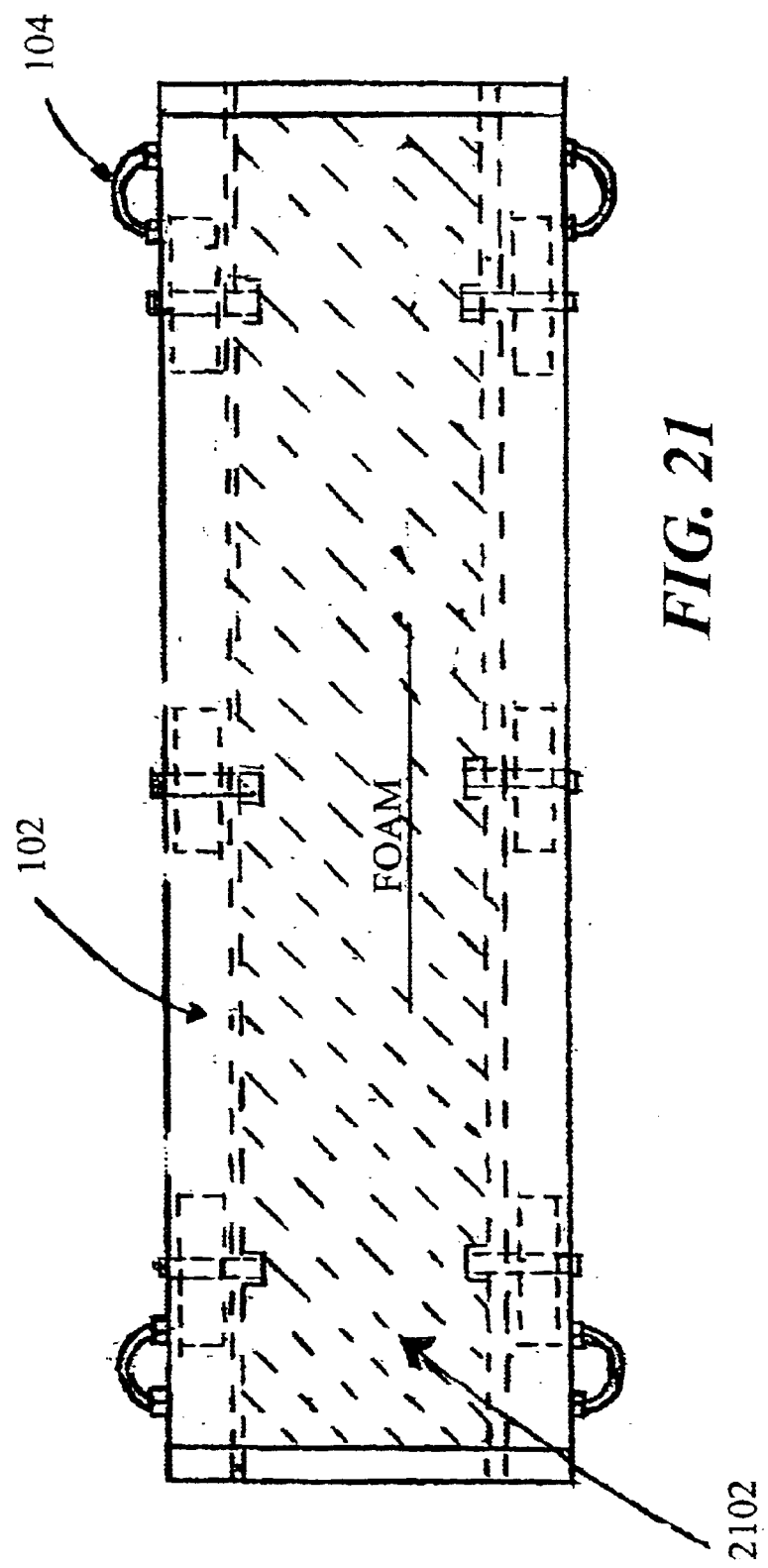
FIG. 21 is a top view of the alternate embodiment of the cart of FIG. 20 with flotation foam, according to the present invention.

FIG. 21 top view of mini sled showing floatation foam 2102 inserted in the bottom under portion of the cart 102 to increase floatation of the cart in applications where there is water such as fire fighting.

Non-limiting Examples

The invention is not limited to any particular end product such as a rescue cart but may be applied to any similar structure for use in alternate products, such as a portable tool crib for high rise steel workers, or as would be known to one of ordinary skill in the art. Moreover, although two exemplary dimensions are given, the invention is not limited to a particular size or dimension as understood by those of average skill in the art.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A cart for transporting objects in a hazardous environment, the cart comprising:

a watertight compartment with a bottom and sides the watertight compartment adapted for the storage and transportation of tools and equipment;

at least one handle attached to the watertight compartment for controlling the watertight compartment; and a plurality of friction abating devices affixed to the watertight compartment for moving the watertight compartment to a location;

a pair of foldable doors forming a top to the watertight compartment, each of the doors having a stationary section, a folding section, and a hinge near a center of each of the doors so that the folding section of each of the doors can fold away from each other, wherein the folding doors, when folded away from each other, form an opening properly dimensioned so as to be able to accept an air tank placed into the opening while the air tank is strapped onto a victim lying across the top surface of the watertight compartment while supporting at least a portion of a torso of the victim on the folding section of each of the doors when folded away from each other.

2. The cart according to claim 1, wherein the watertight compartment comprises one or more walls constructed from metal, plastic, fiberglass, rubber, composite, or a combination thereof.

3. The cart according to claim 1, wherein the top surface of the watertight compartment has an opening properly dimensioned so as to be able to accept an air tank placed into it when the air tank is strapped onto a victim's back while the victim is lying on his or her back across the top surface of the watertight compartment while supporting the victim's back on the top surface.

4. The cart according to claim 1, wherein the top surface of the watertight compartment has an opening properly dimensioned so as to be able to accept an air tank placed into it when the air tank is strapped onto a victim's front while the victim is lying on his or her front across the top surface of the watertight compartment while supporting the victim's front on the top surface.

5. The cart according to claim 1, wherein the plurality of friction abating devices includes wheels.

6. The cart according to claim 1, wherein the compartment is adapted to store jaws of life, foam dispensers, lights, communication equipment, blankets, ax, saws, helmet, breathing equipment, smoke & fume sensors, noise makers, ropes, communication equipment, a Global positioning Satellite (GPS) device, and first aid material.

7. A cart for transporting objects in a hazardous environment, the cart comprising:

a watertight compartment with a bottom and sides; and two or more hinged doors forming a top surface, the two or more hinged doors include a stationary section and a hinged folding section with an open position where the two or more hinged folding sections fold away from each other so as to form an opening in the top surface and a closed position where the two or more hinged folding sections fold towards each other covering the opening in the top surface;

wherein the two or more hinged doors are properly sized in the open position so as to form an opening in the top surface for accepting at least an air tank strapped to a victim when the victim is lying across the top surface, while supporting at least a portion of the torso of the victim on the folding section of each door in the open position;

at least one handle attached to the watertight compartment; and at least one friction abating device which eases the pulling or pushing of the watertight compartment across the ground.

8. The cart according to claim 7, wherein the one or more hinged doors are properly sized so as to form an opening in the top surface capable of accepting at least an air tank strapped to a back of the victim when the victim is lying on his or her back across the top surface but so that the opening in the top surface is smaller than approximately 18 inches to prevent the shoulders of the victim from entering the opening.

9. The cart according to claim 7, wherein the one or more hinged doors are properly sized so as to form an opening in the top surface capable of accepting at least an air tank strapped to a front of the victim when the victim is lying on his or her front across the top surface but so that the opening in the top surface is smaller than approximately 18 inches to prevent the shoulders of the victim from entering the opening.

10. The cart according to claims 7, further comprising the watertight compartment being covered with Kevlar to protect against gun fire.

11. The cart according to claim 7, further comprising an opening in the watertight compartment for receiving a handle to retract thereinto.

* * * * *